United States Patent
Zortman et al.

(10) Patent No.: US 9,052,535 B1
(45) Date of Patent: Jun. 9, 2015

(54) ELECTRO-REFRACTIVE PHOTONIC DEVICE

(71) Applicant: Sandia Corporation, Albuquerque, NM (US)

(72) Inventors: William A. Zortman, Corrales, NM (US); Michael R. Watts, Hingham, MA (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/055,709

(22) Filed: Oct. 16, 2013

Related U.S. Application Data (60) Provisional application No. 61/737,529, filed on Dec. 14, 2012, provisional application No. 61/738,867, filed on Dec. 18, 2012.

(51) Int. Cl.
*G02F 1/01* (2006.01)
*G02F 1/015* (2006.01)

(52) U.S. Cl.
CPC .................................. *G02F 1/015* (2013.01)

(58) Field of Classification Search
USPC ......................................................... 359/279
See application file for complete search history.

(56) References Cited

U.S. PATENT DOCUMENTS

| 5,991,473 A * | 11/1999 | Nishikata et al. ................ 385/14 |
| 2002/0030198 A1 * | 3/2002 | Coman et al. .................. 257/103 |

OTHER PUBLICATIONS

Watts, et al., "Vertical Junction Silicon Microdisk Modulators and Switches", Optics Express, vol. 19, No. 22, Oct. 24, 2011, pp. 1-15.

* cited by examiner

*Primary Examiner* — James Jones
(74) *Attorney, Agent, or Firm* — Martin I. Finston (57) ABSTRACT

The various technologies presented herein relate to phase shifting light to facilitate any of light switching, modulation, amplification, etc. Structures are presented where a second layer is juxtaposed between a first layer and a third layer with respective doping facilitating formation of p-n junctions at the interface between the first layer and the second layer, and between the second layer and the third layer. Application of a bias causes a carrier concentration change to occur at the p-n junctions which causes a shift in the effective refractive index per incremental change in an applied bias voltage. The effective refractive index enhancement can occur in both reverse bias and forward bias. The structure can be incorporated into a waveguide, an optical resonator, a vertical junction device, a horizontal junction device, a Mach-Zehnder interferometer, a tuneable optical filter, etc.

20 Claims, 6 Drawing Sheets

ELECTRO-REFRACTIVE PHOTONIC DEVICE

RELATED APPLICATIONS

This application claims priority to U.S. Provisional Patent Application No. 61/737,529 filed on Dec. 14, 2012, entitled "ELECTROREFRACTIVE PHOTONIC DEVICE", the entirety of which is incorporated herein by reference. This application also claims priority to U.S. Provisional Patent Application No. 61/738,867 filed on Dec. 18, 2012, entitled "ELECTROREFRACTIVE PHOTONIC DEVICE", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

It has long been known that elements that shift the phase of an optical signal in response to an input signal are extremely useful for the control of optical signals, both as such and as components of more complex devices. For example, filters, switches, and modulators can all be constructed, at least in part, from phase-shifting elements.

Useful phase-shifting elements have been based on various underlying physical phenomena. Among these phenomena is the free-carrier effect in semiconductive optical media, whereby the refractive index of an optical medium at a given wavelength is dependent on the density of free carriers, i.e. of mobile electrons and/or holes, in the optical medium.

A free-carrier modulator can be implemented in silicon, whereby the application of a forward or reverse bias voltage modulates the carrier density in the region of a p-n junction. Changes in the carrier density lead to changes in the refractive index in the optical path, which lead, in turn, to modulation of the phase of the propagating optical signal.

A resonant free-carrier modulator can have a resonant frequency $\omega_m$ that exhibits a shift $\Delta\omega_m$ which is proportional to $\omega_m$, with $\omega_m$ further depending on an overlap between the change of the depletion width in the junction region and the energy distribution of the guided resonant optical mode. The depletion width, in turn, is controlled by a bias voltage applied across the junction. Accordingly, the same electrorefractive effect that modulates the refractive index can also be utilized to shift the resonant frequency of a device (whereby the resonant frequency can be a function of the refractive index), thus leading to applications in spectrally selective modulation and filtering.

As mentioned, refractive index can depend on carrier concentrations, Eqn. 1 provides an empirical expression for the refractive index change $\Delta n$ in the junction region in silicon at a wavelength of 1550 nm:

$$\Delta n = AN^B + jCN^D \qquad \text{Eqn. 1}$$

where $j^2 = -1$, N is the electron or hole concentration, and the parameters A, B, C, and D are provided in the following table:

TABLE 1

Refractive Index Change Parameters

| | A (×10⁻²⁴) | B | C (×10⁻²⁴) | D |
|---|---|---|---|---|
| For electrons | −23.7 | 1.08 | 0.0492 | 1.2 |
| For holes | −3,930,000 | 0.82 | 1.96 | 1.1 |

An estimation of how a depletion width w can be varied by a voltage applied across a junction can be determined per Eqn. 2:

$$w = \sqrt{\frac{2\varepsilon}{q} \cdot \frac{N_A + N_D}{N_A N_D}} (V + \varphi_B) \qquad \text{Eqn. 2}$$

where $\varepsilon$ is the dielectric constant, q is the electronic charge, V is the applied voltage, $\phi_B$ is the built-in potential, and $N_D$ and $N_A$ are respectively the donor and acceptor concentrations.

Junction-based free-carrier modulators and similar devices have advantageous properties. However, the free-carrier effect for such devices is often weaker than other physical mechanisms for producing refractive index changes. Therefore, there remains a need for further enhancements in the effectiveness of junction-based free-carrier modulators and the like.

SUMMARY

The following is a brief summary of subject matter that is described in greater detail herein. This summary is not intended to be limiting as to the scope of the claims.

Various exemplary embodiments presented herein relate to phase shifting of a signal. In an exemplary embodiment an apparatus is presented, the apparatus comprising a first semiconductive contact region having a first predominant carrier type, a second semiconductive contact region having a second predominant carrier type opposite to the first predominant carrier type, and an optical confinement structure that can comprise of two layers of the first predominant carrier type and one layer of the second predominant carrier type. In a further embodiment, the second-type layer can be juxtaposed between the first-type layers and can form a p-n junction with each said first-type layer, and further the first contact region can contact the first-type layers and the second contact region can contact the second-type layer such that in operation a sufficient voltage applied across the contact regions and constituting a forward bias relative to said regions can create a forward bias across both said p-n junctions, and a sufficient voltage can be applied across the contact regions and constituting a reverse bias relative to said regions can create a reverse bias across both said p-n junctions.

Another exemplary embodiment is presented comprising a method for forming and operating a phase-shifting device, the method comprising forming a first semiconductive contact region having a first predominant carrier type, forming a second semiconductive contact region having a second predominant carrier type, and forming an optical confinement layer between the first semiconductive contact and the second semiconductive contact. In an embodiment, a first side of the optical confinement layer can abut a side of the first semiconductive region and a second side of the optical confinement layer can abut a side of the second semiconductive region. The method further comprising forming a first layer in the optical confinement layer by doping the first layer with the first predominant carrier type and forming a second layer in the optical confinement layer by doping the second layer with the second predominant carrier type, wherein the second layer is formed over the first layer, and further forming a third layer in the optical confinement layer by doping the third layer with the first predominant carrier type. The third layer can be formed over the second layer and the respective layers are conformed such that in operation, an effective bias applied between the first semiconductive contact region and the second semiconductive contact region can generate a first carrier depletion zone at a first junction formed between the first layer and the second layer. Further, application of the bias can generate a second carrier depletion zone at a second junction formed between the second layer and the third layer.

A further exemplary embodiment for electrorefractive optical phase modulation can comprise a method which can include admitting a light beam through a waveguiding structure comprising a stack of three semiconductor layers conformed such that a central layer forms a p-n junction with each of the two outlying layers. The method further comprising energizing the semiconductor stack with a voltage applied across a pair of semiconductor contact layers having opposite predominant carrier types such that a forward bias applied across said contact layers causes both p-n junctions to be forward biased and vice versa. The method further comprising varying the applied voltage between forward and reverse bias such that carrier densities near the p-n junction are correspondingly varied.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies relating to phase shifting of an optical signal are presented, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

Figure 1:
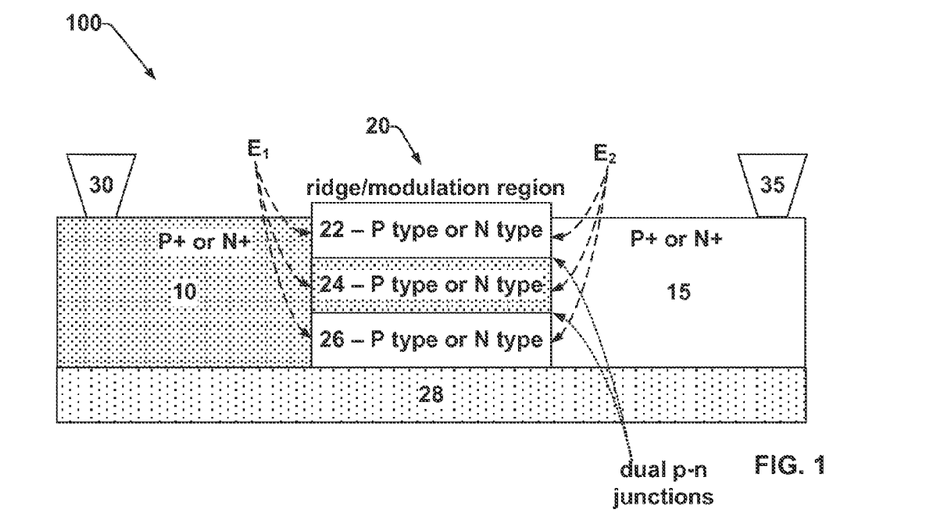
FIG. 1 is a schematic diagram of a phase shifting device, according to an embodiment.

FIG. 1 illustrates a device 100 configured to facilitate phase shifting of an optical signal, according to an embodiment. The phase-shifting device 100 presented in FIG. 1 includes contact regions 10 and 15, which can be formed from opposite predominant carrier types, hence, region 10 may, for example, be doped to be p+ and region 15 is doped to be n+, or vice versa. Device 100 can further comprise a ridge-type modulation region 20, which can include layers 22, 24, and 26. In an exemplary embodiment, layers 22 and 26 can be of the same carrier type, and layer 24 can be of the opposite carrier type. Thus, for example, layers 22 and 26 may be doped p-type and layer 24 may be doped n-type, or vice versa. Because of the differences in carrier type, layer 24 forms p-n junctions with both of the juxtaposing layers 22 and 26, the upper surface of layer 24 can form a p-n junction with the lower surface of layer 22, and the lower surface of layer 24 can form a p-n junction with the upper surface of layer 26. Respective ends $E_1$ and $E_2$ of layers 22, 24, and 26 are adjacent to and/or abut contact regions 10 and 15, where ends $E_1$ collectively form a first side to the ridge-type modulation region 20 and ends $E_2$ collectively form a second side to the ridge-type modulation region 20. Device 100 can further include metal contacts 30 and 35, which can be utilized to apply a voltage across the device 100. The metal contacts 30 and 35 may be formed according to conventional teachings and hence are not discussed in detail herein. In an embodiment, metal contacts 30 and 35 can be formed from any suitable material, e.g., tungsten (W).

In an embodiment, regions 10, 15, and 20 can be formed from silicon (Si). However, other elements, compounds and/or compositions may also be utilized and are not excluded. For example, germanium (Ge) may be a useful composition for applications that are compatible with the optical properties of germanium. Similarly, gallium arsenide (GaAs) may be utilized, along with other III-V compounds and II-VI compounds or other semiconductors.

Those skilled in the art will recognize that the design of FIG. 1 is a vertical junction design, in that the p-n junctions are disposed substantially in horizontal planes as seen in the figure, and thus parallel to a substrate 28 on which device 100 can be formed. Any suitable technique can be utilized to define contact regions 10 and 15.

Given such techniques are conventional they are not described in detail herein. Ion implantation is a technique suitable for defining layers 22, 24, and 26, whereby a selected dopant(s) can be implanted at a desired depth(s) by appropriately setting the implantation energy(ies). Specific examples of dopant species and implant energies are further presented herein.

Vertical junction designs may, in some cases, be advantageous due to relatively simple fabrication processes. However, horizontal junction devices and angled junction devices (e.g., the p-n junction is between vertical and horizontal) may in some cases also be desirable, and are not excluded from the scope of the invention even if not included amongst the explicitly presented embodiments herein. It is to be appreciated that the profile of the junction cross section may be a curved line, a jagged line, a sawtooth line, a squaretooth profile, or any other shape that would enhance the length of a junction region formed between any of regions 10 and 15, and/or layers 22, 24, and/or 26.

In use, an optical beam to be phase-shifted is directed through structure 20 in the direction perpendicular to the plane of FIG. 1. The wavelength of the optical beam may have any value within the transmissive window of silicon or such other material of which structure 20 is composed (e.g., Ge, GaAs, etc.). For silicon, a typical effective wavelength range is about 1.1 to about 3.0 micrometers. If structure 20 is intended to provide optical resonance, it can be dimensioned accordingly, as understood by those skilled in the art. For example, a typical thickness for a silicon-dioxide-clad ($SiO_2$) silicon microdisk resonator for operation at typical wavelengths can be about 220 nm, and typical widths would be in the range of about 3.5 micrometers to about 10 mm, although widths of any required dimension can be utilized in accordance with size limitations of the chip, the mode size of light comprising the optical beam, or an achievable resolution(s) of the fabrication process creating the silicon microdisk resonator.

In use, a bias can be applied between contacts 30 and 35. It is to be understood that if the bias direction is forward relative to regions 10 and 15, then the junction between layer 24 and each of layers 22 and 26 will likewise be forward biased. Conversely, if the bias direction is reverse relative to regions 10 and 15, then the junction between layer 24 and each of layers 22 and 26 will likewise be reverse biased. Application of a forward bias relative to regions 10 and 15 indicates that the more positive pole is applied to the p+ region and the more negative pole is applied to the n+ region. A negative bias indicates an opposite scenario, whereby application of a reverse bias relative to regions 10 and 15 indicates that the more positive pole is applied to the n+ region and the more negative pole is applied to the p+ region. Depending on a specific application, the bias may be provided by any suitable technique, such as, for example, by a DC voltage source, by a microwave frequency voltage source, etc. The bias can be controlled in accordance with the desired operation that the device 100 is to perform, e.g., modulation, switching, filtering, etc.

Figure 2:
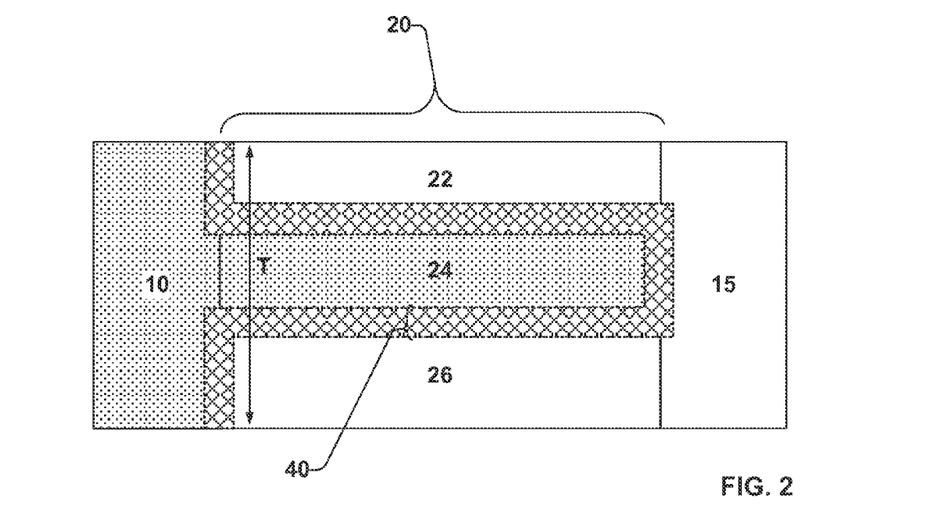
FIG. 2 is a schematic view of a phase shifting device while operating in reverse bias, according to an embodiment.

FIG. 2 presents a schematic view of the device 100 of FIG. 1 where device 100 is operating in a condition of reverse bias, according to an embodiment. The shaded serpentine junction region 40 of FIG. 2 represents a carrier depletion region. As shown in FIG. 2, utilization of dual p-n junctions can provide a longer effective depletion region than would be available in a device utilizing a single p-n junction. A result of the longer effective depletion region 40 is an increased shift in the effective refractive index per incremental change in an applied voltage. The enhancement in the effective refractive index per incremental change in the applied voltage can be experienced not only in reverse bias, but also in forward bias. In the case of forward bias, charge injection can take place in the junction region 40, leading to an increase in the free carrier density in the junction region 40.

In this regard, it is to be noted that a typical useful range for the voltage applied to a silicon-based device, as described in the various embodiments presented herein, would be about +1 to about −7 volts, where such values correspond to a range between the turn-on voltage for forward bias to the breakdown voltage in reverse bias. As understood by those skilled in the art, when operated in forward or reverse bias, the signal input to the device 100 can be AC or DC coupled. It is to be noted that a device (e.g., device 100) as described herein can be compatible with differential signaling.

Further, the various devices and associated embodiments presented herein may facilitate several further advantages in addition to an increased sensitivity to the applied voltage. For example, for filter applications it can be possible to shift a resonant wavelength by varying the applied voltage, without a requirement to heat the device for thermal tuning. This possibility can be due in part to a larger resonant frequency shift available to a device with a longer depletion region as presented in accord with the various embodiments presented herein. Owing to the electro-optic effect generally having a faster timescale than the thermo-optic effect, this can lead to the possibility of operating at higher frequencies than might otherwise be possible.

In particular, it is to be noted that higher frequencies of operation are generally more attainable with reverse bias than with forward bias. However, exploitation of this property in a junction-based, free-carrier, index-shifting device has been limited until now, because of the relative weakness of the index-shifting effect in reverse bias. However, by providing a dual p-n junction as presented in the various embodiments herein, the effect can be enhanced to a sufficient extent to render filtering practical at high frequencies, such as about 100 GHz or more.

Methods for the specific design and fabrication of the device described herein are well known to those skilled in the art. In particular, the total thickness of region 20 can be dictated by the pertinent refractive index and by the desired wavelength of operation of the device. The total thickness T of region 20 can, in a typical embodiment, be divided approximately equally among layers 22, 24, and 26. The various effects of varying the respective thicknesses of layers 22, 24, and 26, and of varying the dopant densities therein can be based on various factors. For example, the dopant densities in layers 22, 24, and 26 can be selected based at least in part on an optimal balance between a desired strength of the free-carrier effect and an acceptable level of optical loss. Accordingly, increasing the dopant density can tend to increase the refractive index change, but an increased dopant density can also tend to increase loss from the optical signal beam due to absorption and scattering.

Figure 3:
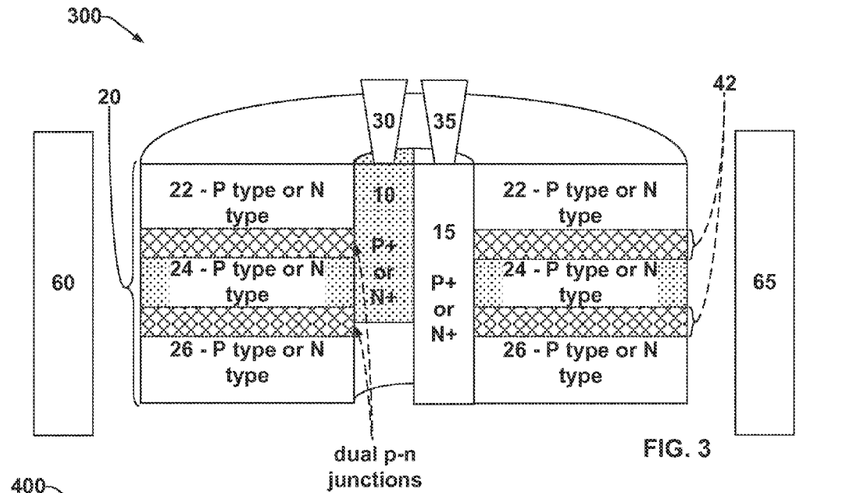
FIG. 3 is a schematic diagram of a phase shifting device which utilizes a disk-type modulation region, according to an embodiment.

As presented, FIG. 1 illustrates a phase-shifting device 100 with an optical design which can be conformed in a ridge waveguide geometry, i.e., a rectangular geometry. However, it is to be appreciated that the various embodiments presented herein can be readily applied to other optical geometries, such as those of optical resonators having a disk configuration and a ring configuration. FIG. 3 illustrates a phase-shifting device 300 having a disk geometry, according to an embodiment. As shown in FIG. 3, contact region 10 connects metal contact 30 with doped layer 24, and contact region 15 connects metal contact 35 with doped layers 22 and 26, with dual p-n junctions occurring as indicated. Similar to the depletion region 40, as shown in FIG. 2, depletion regions 42 can be formed in device 300; layer 24 forms p-n junctions with both of the juxtaposing layers 22 and 26, the upper surface of layer 24 can form a p-n junction with the lower surface of layer 22, and the lower surface of layer 24 can form a p-n junction with the upper surface of layer 26. Biasing across contacts 30 and 35, as previously described, can be applied in reverse bias and also in forward bias. As shown, device 300 can be utilized, in an embodiment, with waveguides 60 and 65, operation of which is expanded upon in FIG. 4.

Utilizing an optical resonator(s) can be advantageous for applications of the phase-shifting device directed towards optical filtration as well as modulation. In an embodiment, the electro-optic effect on the free carrier distribution due to the applied voltage can be utilized to shift a resonant wavelength. Thus, modulation may be effectuated by shifting the device (e.g., any of devices 100, 200 and/or 300) in and out of resonance with the signal wavelength. Similarly, a tunable filter may be provided by shifting the resonant wavelength to coincide with a desired signal channel. It should be noted that for purposes of optical filtration, filters of first, second, or any higher order may be constructed in accord with the various embodiments presented herein. As will be understood by those skilled in the art, a higher-order filter can be constructed based on a combination of two or more mutually optically coupled resonator structures having a configuration(s) as presented herein.

The following present typical design and fabrication parameters utilized for a silicon-based microdisk modulator having a single vertical p-n junction. It is to be appreciated that the following parameters can be readily adjusted to facilitate fabrication of a device (e.g., device 100, 200, and/or 300) based on the embodiments presented herein, e.g., the operations are adjusted to facilitate incorporation of three layers (e.g., layers 22, 24, and 26) as required to form a device having dual p-n junctions. A typical modulator device can fabricated from a silicon-on-insulator (SOI) wafer with a 250 nm silicon layer and a buried oxide layer which may be of variable thickness depending on the application, semiconductor and/or a wavelength of light comprising the optical beam. For modification to a device (e.g., device 100, 200, and/or 300) based on the embodiments presented herein, the 250 nm silicon layer can be apportioned equally or unequally among layers 22, 24 and 26. A deep ultraviolet laser scan and reactive ion etch can be utilized to define the various modulator features. Further, a sacrificial oxidation at about 950° C. can be performed to remove etch damage, followed by oxidation at about 1100° C. to passivate the silicon sidewall preparatory to doping by ion implantation. The designed doping concentration in the p-type and n-type layers can be about $2 \times 10^{18}$ cm$^{-3}$, however such concentration can vary according to application, wavelength of the optical beam and/or a substrate material. After ion implantation in the diode and contact layers, the device can be annealed at about 900° C., followed by deposition of a 1.6 micrometer layer of plasma enhanced tetraethyl orthosilicate (PETEOS) and chemical mechanical polishing of the PETEOS back to 0.9 micrometers. Low-resistance contacts (e.g., contacts 30 and 35) can then be formed, followed by chemical mechanical polish and metallization as required to form interconnect and contact pads. In another embodiment, implant parameters can be for the layers 22, 24, and 26, in the junction region, the top and bottom n-type layers can be implanted with phosphorus at a dose of $8 \times 10^{13}$ cm$^{-2}$ at energies of 380 and 38 keV, while for the middle p-type layer, boron difluoride can be implanted at a dose of $1.12 \times 10^{14}$ cm$^{-2}$ at an energy of 187 keV. The implant layers can be reversed by using appropriate dopant energies to create p-type layers on the top and bottom and an n-type layer in the middle.

Figure 4:
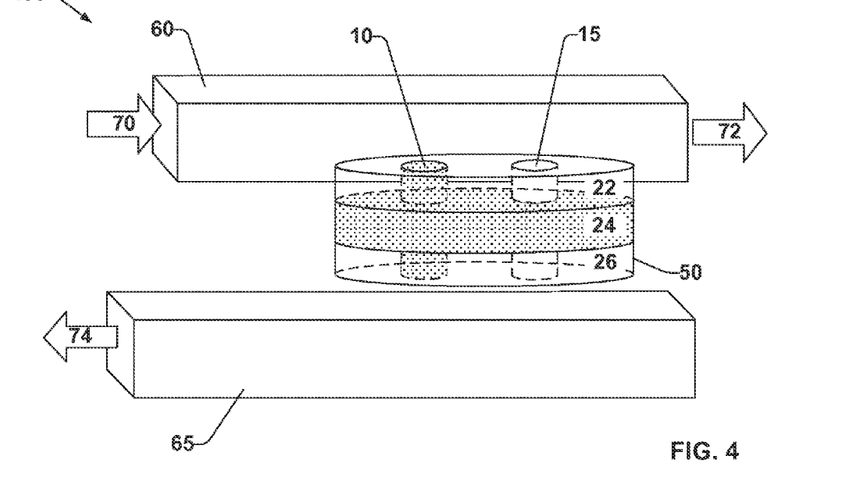
FIG. 4 is a schematic diagram of a phase-shifting device for resonant switching or filtering in which the phase-shifting device interacts with an input-throughput waveguide and a drop waveguide via evanescent coupling, according to an embodiment.

FIG. 4 illustrates a system 400 comprising a device which can facilitate resonant switching, operation as a filtering device and/or a phase shifter, in accordance with an embodiment. In an embodiment, system 400 can include a phase-shifter device 50 which can be configured to interact with an input-throughput waveguide 60 and a drop waveguide 65, e.g., via evanescent coupling. Arrow 70 represents an input optical signal, arrow 72 represents an optical signal that has passed through the device, and arrow 74 represents a drop signal that is output from the device 50. As illustrated in FIG. 4, in an embodiment, the optical propagation direction in waveguides 60 and 65 can be rectilinear. In a further embodiment, the optical propagation direction in device 50 can be circulatory and hence, in an embodiment, lead to a build-up of power in device 50 over time as light from the input optical signal 70 is coupled into the device 50. By controlling a voltage applied to contact regions 10 and 15, it is possible to tune the device 50 such that, for example: (a) only a selected wavelength is passed through the input-throughput waveguide 60 as indicated by arrow 72, or (b) only a selected wavelength is passed through or not passed through, according to the state of the applied voltage.

Accordingly, resonant filtration and switching operations can be performed by device 50 in conjunction with waveguides 60 and 65. For example, when device 50 is operating in 'on-resonance' mode, zero power or low power is being transmitted at 72 as the input light 70 is being coupled into the resonator 50, such that a corresponding amount of optical energy excites the resonant field in resonator 50 and is transmitted at 74.

Alternatively, for example, when device 50 is operating in 'off resonance' mode full power is being transmitted at 72 as no light is coupled with device 50 and accordingly no light is being transmitted at 74.

In an exemplary mode of operation, device 50 can have a reverse bias of about 0.5 volts applied during 'on resonance' mode, while in 'off resonance' device 50 can have a forward bias of about 0.5 volts applied. In implementations, a forward bias of 0.5V may be sufficient to shift the device off of resonance, while still low enough that the diode remains turned off relative to the forward-biased current flow. Hence, advantage is taken of the switching between 'on resonance' and 'off resonance' occurring at ±about 0.5V either side of 0 volts, as the depletion zone (e.g., zone 40) expands and contracts per applied voltage to a greater degree at about ±0.5V than is achieved at higher applied voltages, such as −2 volts during a reverse bias, for example. In an embodiment, AC coupling can be applied to device 50 to facilitate efficient operation with less voltage.

Figure 5:
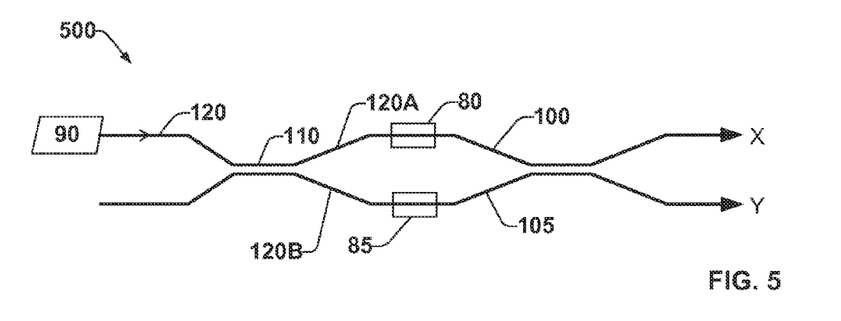
FIG. 5 is a schematic diagram of a Mach-Zehnder modulator or switch in which a phase-shifting device operates on an optical signal beam, according to an embodiment.

FIG. 5 illustrates a schematic diagram of a system 500 which can operate as a Mach-Zehnder modulator or switch, according to an embodiment. The Mach-Zehnder system can include phase-shifting devices 80 and 85, which, as described above, can respectively operate on an optical signal beam 120 provided by a source 90, e.g., laser light source. Beam 120 can be split between a pair of interferometer arms 100 and 105 by a directional coupler 110. Device 80 and/or device 85 can be operated with respective biasing to facilitate control of the relative phase of split beams 120A and/or 120B between the Mach-Zehnder interferometer arms 100 and 105. In an embodiment, phase shifting can be performed on a single interferometer arm or on both interferometer arms 100 and 105 to create interference therebetween to facilitate formation of a 1 and 0 pattern at "X" or "Y", e.g., for amplitude modulation. As is well-known in the art, particular values of the relative phase will cause output to appear only at the port designated by "X" in FIG. 5, whereas other particular values of the relative phase will cause output to appear only at the port designated "Y". Accordingly, a modulation or switching function is readily achieved. In an additional embodiment a waveguide can be implanted using the regime described above to create a phase shifting device.

Figure 6:
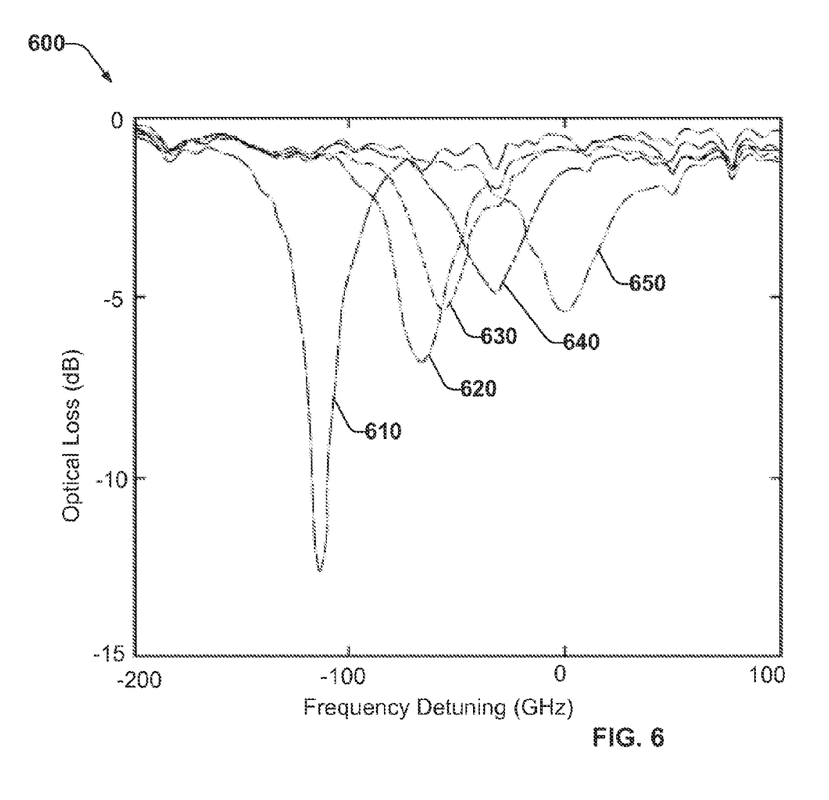
FIG. 6 is a plot representing a voltage-induced shift in the optical resonance of an npn-doped modulator, according to an embodiment.
Figure 7:
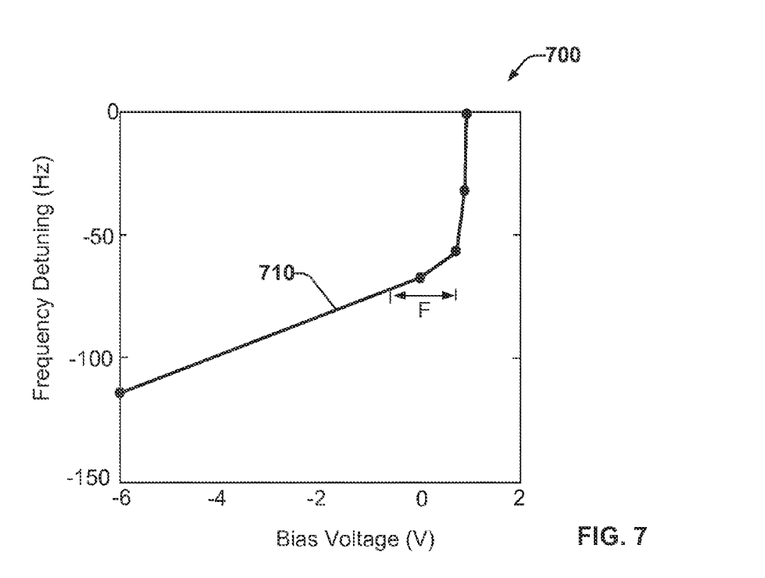
FIG. 7 is a plot representing a voltage-induced shift in the optical resonance of an npn-doped modulator, according to an embodiment.

FIGS. 6 and 7 present charts 600 and 700, representing the voltage-induced shift in the optical resonance of an npn-doped, 3.5 micrometer-diameter, vertical junction microdisk modulator which was fabricated substantially as described above. FIG. 6, plots 610-650 present the optical loss (in decibels, dB's) versus the frequency detuning (GHz) for a plurality of bias voltages −6.00V (as shown by plot 610), 0.00V (as shown by plot 620), 0.70V (as shown by plot 630), 0.87 V (as shown by plot 640), and 0.92V (as shown by plot 650).

As shown in FIG. 6, the ability to detune to 100 GHz renders the embodiments presented herein applicable to such applications as optical filtering, packet switching, etc. The embodiments facilitate operation of a device that can jump channels, for example, which can be hard to achieve with a conventional single p-n junction device. FIG. 7, plot 710 presents the frequency detuning (GHz) versus the bias voltage (V). As previously presented, at a biasing range of about ±0.5V either side of 0 volts (range F) the extent of the depletion zone (e.g., zone 40) can be modified to a greater degree than at, e.g., an applied voltage of −2 volts.

Figure 8:
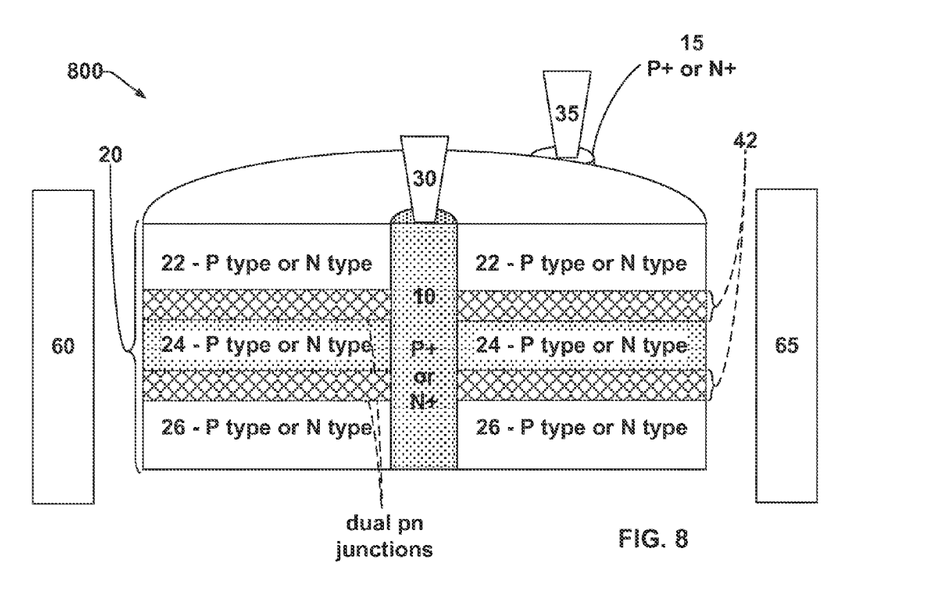
FIG. 8 is a schematic diagram of a phase-shifting device for resonant switching or filtering, according to an embodiment.

FIG. 8 illustrates device 800 which is an alternative structure to that presented in FIG. 4, in accordance with an embodiment. As shown in FIG. 8, contact regions 10 and 15 are separately located, with contact region 10 being located at the center of the ring device 800 connecting with layer 24, and contact 15 is located on an edge of ring device 800 and connecting with layers 22 and 26. As previously mentioned, contact regions can be formed from opposite predominant carrier types, hence, region 10 may, for example, be doped to be p+ and region 15 is doped to be n+, or vice versa. A device contacted as described above could employ horizontal PN junctions, as would be clear to those skilled in the art.

Figure 9:
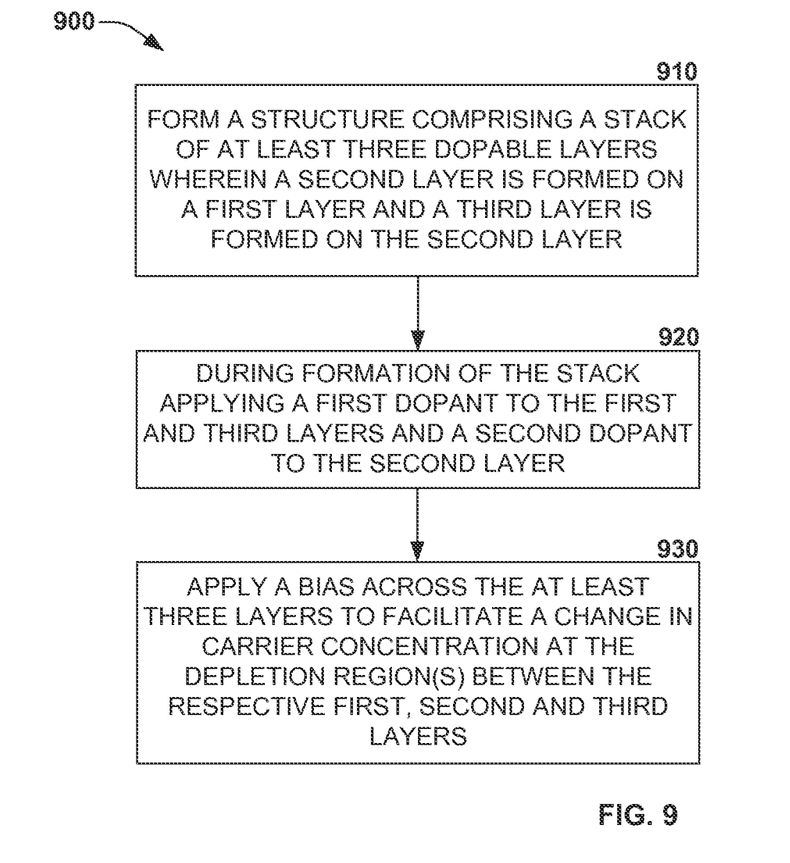
FIG. 9 is a flow diagram illustrating an exemplary methodology for forming a phase shifting device, according to an embodiment.
Figure 10:
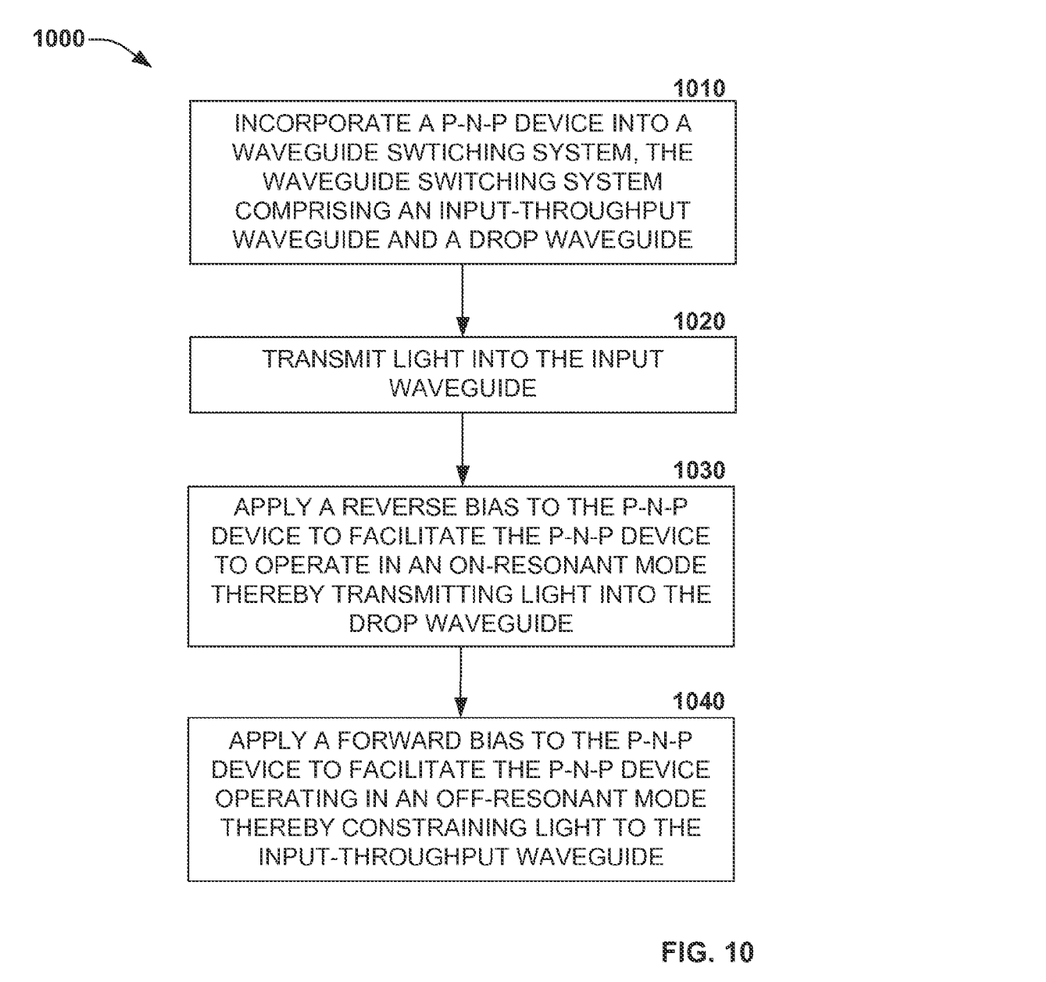
FIG. 10 is a flow diagram illustrating an exemplary methodology for operating a phase shifting device to switch light, according to an embodiment.

FIGS. 9 and 10 are methodologies relating to phase shifting of an optical signal(s). While methodologies 900 and 1000 are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the particular methodology described herein.

FIG. 9 illustrates an exemplary methodology 900 for fabrication and operation of a device(s) to facilitate phase shifting of an optical signal(s). As previously mentioned, a plurality of layers can be doped with various n-type and p-type dopants to facilitate formation of a carrier depletion region which can lead to a shift in the effective refractive index of the plurality of layers when a forward and/or reverse bias is applied.

At 910, an optical confinement structure can be formed, where in an embodiment, the structure can comprise a three layer stack, wherein the second layer in the stack is formed on the first layer, and the third layer is formed on the second layer. The second layer is juxtaposed between the first and third layers. The first layer can be formed by doping with a first dopant, the second layer can be formed over the first layer by doping with a second dopant and the third layer can be formed over the second layer by doping with the first dopant. In an embodiment, the three layer stack can be fabricated with three doped layers formed in a single layer. For example, in an embodiment, the three layers, or regions, can be formed by an ion implantation technique with a first region being formed in the single layer by doping a lower volume of the single layer with a first dopant. A second region can be formed on the first region by doping a middle volume of the single layer with a second dopant. A third region can be formed on the second region by doping an upper volume of the single layer with the first dopant. Accordingly, the single layer is doped to comprise a lower region and an upper region with a first dopant and a second region formed therebetween comprising of a second dopant. Hence, the single layer can be a single volume of material capable of having three doped regions contiguously formed therein.

It is to be appreciated that while the various embodiments presented herein relate to a structure comprising a three layer stack, the various embodiments are not so limited. Instead, the stack can comprise R layers, wherein R is any of a range of positive integers greater than two. For some applications, R can be determined in accordance with dimensioning requirements of the application. For example, a dimensioning limitation may be based at least in part on the wavelength of the light to be optically shifted, such as the light in the 1550-nm telecommunication band for applications using that band.

At 920, during fabrication of the three layer stack, each of the layers can undergo ion implantation. For example, after the first layer is formed and dimensioned to a required size, the layer can be doped with a required dopant, e.g., boron difluoride or other suitable material to form a p-type layer, and arsenic, phosphorus or other suitable material to form an n-type layer. As each layer is formed, the dopant polarity can be alternated so that a stack is formed comprising a pnp structure or a npn structure as previously described.

At 930, a bias can be applied across the three layer stack to change the carrier concentration in the depletion region at each of the p-n junctions formed at respective surface interfaces between a p-type layer and a n-type layer. The carrier depletion layer can lead to a shift in the effective refractive index of the plurality of layers in the stack when a forward and/or reverse bias is applied. Accordingly, the change in effective refractive index can facilitate operations including light switching, light modulation, light phase change, light filtering, light attenuation, etc.

To facilitate application of the respective forward or reverse bias, the three layer stack regions can be coupled to respective predominant p-type carrier and predominant n-type carrier doped semiconductive contact regions which can be further connected to electrical contacts across which the required bias can be applied. For example, the p-type and n-type doped contact regions can be heavily doped to facilitate good ohmic contact between the electrical contacts and the respective p or n stack layers.

FIG. 10 illustrates an exemplary methodology 1000 for incorporating a phase shifting device into a waveguide system and operating it. As previously mentioned, a device can be fabricated whereby a plurality of constituent layers are be doped with various n-type and p-type dopants to facilitate formation of one or more carrier depletion regions. This can lead to a shift in the effective refractive index of the plurality of layers when a forward and/or reverse bias is applied. At 1010, a phase shifting device can be incorporated into a system comprising an input-throughput waveguide and a drop waveguide.

At 1020, light can be transmitted into the input-throughput waveguide.

At 1030, in a first operation, a reverse bias can be applied to the phase shifting device to facilitate operation of the pnp device in an on-resonant mode. Accordingly, during operation in the on-resonant mode, the phase shifting device becomes optically coupled to the input waveguide with the light transmitted in the input waveguide being subsequently transmitted into the phase shifting device. Light captured in the phase shifting device can increase in intensity such that coupling between the phase shifting device and the drop waveguide occurs leading to the light inputted into the input-throughput waveguide to be switched to the drop waveguide.

At 1040, in a second operation, a forward bias can be applied to the phase shifting device to facilitate operation of the pnp device in an off-resonant mode. Accordingly, during operation in the off-resonant mode, the phase shifting device is optically de-coupled from the input waveguide, whereby the light transmitted in the input waveguide remains in the waveguide.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An apparatus comprising:
   a first semiconductive contact region having a first predominant carrier type;
   a second semiconductive contact region having a second predominant carrier type opposite to the first predominant carrier type; and
   an optical confinement structure that comprises two layers of the first predominant carrier type and one layer of the second predominant carrier type, wherein:
   the second-type layer is juxtaposed between the first-type layers and forms a p-n junction with each said first-type layer; and
   the first contact region contacts the first-type layers and the second contact region contacts the second-type layer such that in operation, a sufficient voltage applied across the contact regions and constituting a forward bias relative to said regions will create a forward bias across both said p-n junctions, and a sufficient voltage applied across the contact regions and constituting a reverse bias relative to said regions will create a reverse bias across both said p-n junctions.

2. The apparatus of claim 1, wherein the optical confinement structure is conformed as a rectangular waveguide.

3. The apparatus of claim 1, wherein the optical confinement structure is conformed as an optical resonator.

4. The apparatus of claim 1, wherein the first and second contact regions and the optical confinement structure are made from a semiconductor.

5. The apparatus of claim 1, wherein the p-n junctions are disposed such that the apparatus is conformed as one of a vertical junction device, a horizontal junction device, or an angled device with the p-n junction conformed at an angle between vertical and horizontal.

6. The apparatus of claim 1, wherein the p-n junctions are disposed such that creation of one of a forward bias or a reverse bias forms a depletion region with a geometry comprising one of a straight profile, a jagged profile, a curved profile, a sawtooth profile, or a squaretooth profile.

7. The apparatus of claim 1, conformed as an optical modulator.

8. The apparatus of claim 1, wherein the optical confinement structure is contained within an arm of a Mach-Zehnder interferometer and the apparatus is conformed to operate as at least one of an optical modulator or as an optical switch.

9. The apparatus of claim 1, wherein the optical confinement structure is contained within a waveguide and the apparatus is conformed to operate as at least one of an optical phase shifter or as an optical attenuator.

10. The apparatus of claim 1, wherein the optical confinement structure is conformed as an optical resonator and the apparatus is conformed to operate as at least one of an optical modulator, an optical attenuator, an optical phase shifter, or a tuneable optical filter.

11. The apparatus of claim 1, wherein the optical confinement structure is conformed as one of two or more mutually optically coupled optical resonators and the apparatus is conformed to operate as a tuneable optical filter.

12. A method, comprising:
   forming a first semiconductive contact region having a first predominant carrier type;
   forming a second semiconductive contact region having a second predominant carrier type;
   forming an optical confinement layer between the first semiconductive contact and the second semiconductive contact, wherein a first side of the optical confinement layer abuts a side of the first semiconductive region and a second side of the optical confinement layer abuts a side of the second semiconductive region;
   forming a first layer in the optical confinement layer by doping the first layer with the first predominant carrier type;
   forming a second layer in the optical confinement layer by doping the second layer with the second predominant carrier type, wherein the second layer is formed over the first layer; and
   forming a third layer in the optical confinement layer by doping the third layer with the first predominant carrier type, wherein the third layer is formed over the second layer and the respective layers are conformed such that in operation, an effective bias applied between the first semiconductive contact region and the second semiconductive contact region will generate a first carrier depletion zone at a first junction formed between the first layer and the second layer and will further generate a second carrier depletion zone at a second junction formed between the second layer and the third layer.

13. The method of claim 12, wherein the first semiconductive contact region, the second semiconductive contact region, and the optical confinement layer are made from a semiconductor.

14. The method of claim 12, wherein the first junction and the second junction are disposed such that an apparatus comprising the first junction and second junction is a vertical junction device.

15. The method of claim 12, wherein the first junction and the second junction are disposed such that an apparatus comprising the first junction and second junction is one of a horizontal junction device or an angled device with the first junction and the second junction conformed at an angle between vertical and horizontal.

16. The method of claim 12, wherein the first junction and the second junction are disposed such that the first carrier depletion zone has one of a straight profile, a jagged profile, a curved profile, a sawtooth profile, or a squaretooth profile, and the second carrier depletion zone has one of a straight profile, a jagged profile, a curved profile, a sawtooth profile, or a squaretooth profile.

17. The method of claim 13, wherein the bias is one of a reverse bias or a forward bias.

18. A method of electrorefractive optical phase modulation, comprising:

admitting a light beam through a waveguiding structure comprising a stack of three semiconductor layers conformed such that a central layer forms a p-n junction with each of the two outlying layers;

energizing the semiconductor stack with a voltage applied across a pair of semiconductor contact layers having opposite predominant carrier types such that a forward bias applied across said contact layers causes both p-n junctions to be forward biased and vice versa; and varying the applied voltage between forward and reverse bias such that carrier densities near the p-n junction are correspondingly varied.

19. The method of claim 18, wherein the variation in carrier densities near the p-n junction effects a change in a refractive index of the waveguiding structure, and a resonant frequency of the waveguiding structure is a function of the refractive index.

20. The method of claim 18, wherein the waveguiding structure is contained within one of an optical phase shifter, an optical attenuator, a Mach-Zehnder interferometer, or a tuneable optical filter.

* * * * *